United States Patent [19]

Satake

[11] Patent Number: 4,488,481

[45] Date of Patent: Dec. 18, 1984

[54] APPARATUS FOR PRODUCING RICE OF SUPERHIGH GLOSS

[75] Inventor: Toshihiko Satake, Higashihiroshima, Japan

[73] Assignee: Satake Engineering Co., Ltd., Tokyo, Japan

[21] Appl. No.: 380,123

[22] Filed: May 20, 1982

Related U.S. Application Data

[62] Division of Ser. No. 128,388, Mar. 10, 1980, abandoned.

[30] Foreign Application Priority Data

| | | | |
|---|---|---|---|
| Mar. 19, 1979 | [JP] | Japan | 54-31005 |
| Mar. 19, 1979 | [JP] | Japan | 54-31006 |
| Apr. 3, 1979 | [JP] | Japan | 54-39350 |

[51] Int. Cl.$^3$ .......... A23B 9/00

[52] U.S. Cl. .......... 99/517; 99/518; 426/479

[58] Field of Search .......... 99/485, 517, 518, 467, 99/482; 426/474, 479, 618, 627

[56] References Cited

U.S. PATENT DOCUMENTS

| | | | |
|---|---|---|---|
| 4,133,257 | 1/1979 | Satake | 99/518 |
| 4,155,295 | 5/1979 | Satake | 99/518 |

FOREIGN PATENT DOCUMENTS 52-107953 9/1977 Japan .

*Primary Examiner*—Robert W. Jenkins
*Attorney, Agent, or Firm*—Bert J. Lewen

[57] ABSTRACT

A method of producing rice of superhigh gloss wherein rice grains which have been polished to a yield of below 96% with respect to brown rice are cooled below 25° C. by supplying to the rice grains a current of cooling and humidifying air of a humidity capable of maintaining the rice grains at an equilibrium moisture content, and then the rice grains are polished while being humidified and exposed to an air current. An apparatus for producing rice of superhigh gloss comprising rice grain cooling and humidifying means, and rice polishing means connected to the rice grain cooling and humidifying means for polishing the rice grains by rubbing while humidifying and applying air current to the rice grains.

8 Claims, 3 Drawing Figures

APPARATUS FOR PRODUCING RICE OF SUPERHIGH GLOSS

This is a division of application Ser. No. 128,388, filed Mar. 10, 1980, now abandoned.

BACKGROUND OF THE INVENTION

This invention relates to an apparatus for producing rice of superhigh gloss.

In one method known in the art for producing rice of superhigh gloss without adding and applying talc or other glazing agent to the grains of rice, moisture is caused to adhere to and be absorbed by the surface of rice to soften the very thin surface layers of the grains of rice, and the softened surface layers are caused by friction to strip off the grains to produce moisture-containing rice-bran which is removed by current of air from the rice, to thereby produce rice of superhigh gloss.

The method of the prior art described hereinabove has the disadvantage that the rice of superhigh gloss produced does not attain the desired level sometimes. Particularly when the temperature rises, difficulties are experienced in producing rice of the desired superhigh gloss level.

SUMMARY OF THE INVENTION

The present invention obviates the aforesaid disadvantage of the prior art. Accordingly, the invention has as its object the provision of a method of producing rice of superhigh gloss and an apparatus suitable for carrying the method into practice, which cause no crack formation in the grains of rice and increase the affinity of rice grains with water so that rice grains of the desired superhigh gloss level and high quality can be produced at high yield by increasing the surface hardness of the rice grains.

According to the invention, the aforesaid object is accomplished by a method of producing rice of superhigh gloss, characterized by the steps of supplying a current of cooling air to rice grains which have been polished beforehand to a yield of below 96% with respect to brown rice so as to reduce the temperature of polished rice grains below 25° C. and humidify same, said current of cooling air having a humidity capable of maintaining the rice grains at an equilibrium moisture content at a temperature below 25° C., and rubbing the surfaces of the rice grains while further humidifying same and while subjecting same to the action of an air current so as to polish the rice grains.

According to the invention, the aforesaid object is further accomplished by an apparatus for producing rice of superhigh gloss, comprising rice grain cooling and humidifying means including a vessel formed with a rice grain supply port and a rice grain outlet port, and an air supply means including an air cooling means and an air humidifying means and opening in a rice grain passage in the vessel, and rice polishing means including a rice grain supply section connected to the rice grain outlet port of the rice grain cooling and humidifying means, a perforated wall cylinder communicating with the rice grain supply section, an aerating and rice polishing roller rotatably supported in the perforated wall cylinder, and a venting means and a moisture adding means connected to a rice polishing chamber defined between the perforated wall cylinder and the aerating and rice polishing roller.

The invention may be carried into practice in various ways but one specific embodiment will be described, by way of example, with reference to the accompanying drawings.

DESCRIPTION OF THE PREFERRED EMBODIMENT

Figure 1:
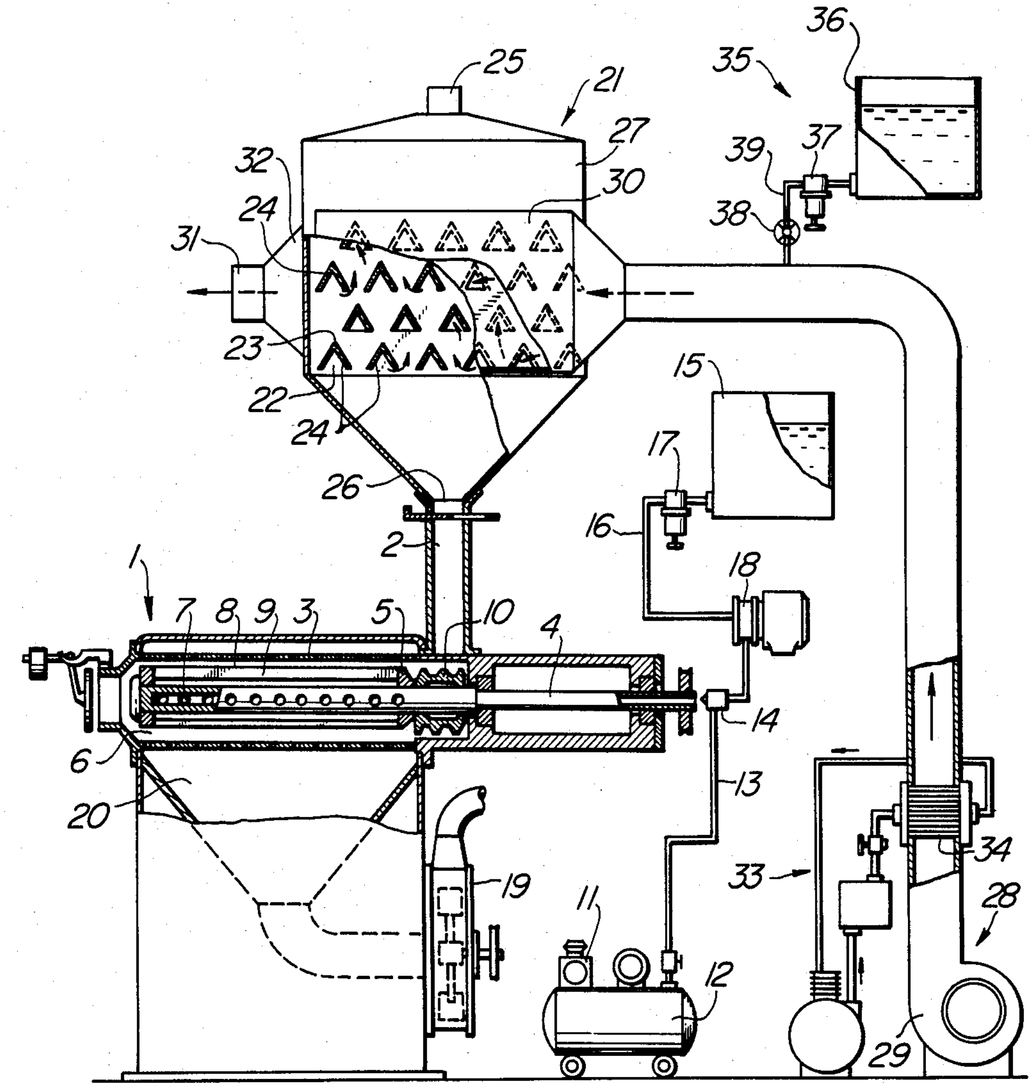
FIG. 1 is a front view, with certain parts being shown in section, of one embodiment of the invention.

Referring to FIG. 1, rice polishing means generally designated by the reference numeral 1 includes a rice supply section 2 in its upper portion. A perforated wall cylinder 3 has a aerating and rice polishing roller 5 disposed in its interior and supported by a hollow rotary shaft 4 for rotation therewith. A rice polishing chamber 6 is defined between the perforated wall cylinder 3 and the aerating and rice polishing roller 5. The rotary shaft 4 is formed with a plurality of aerating openings 7 in a portion thereof which has the aerating and rice polishing roller 5 mounted thereon. The aerating and rice polishing roller 5 is formed with axial slits 9 adjacent projections 8 for rubbing rice grains to maintain the interior of the aerating and rice polishing roller 5 in communication with the rice polishing chamber 6. The rotary shaft 4 also supports a rice grain transfer roll 10 disposed adjacent the aerating and rice polishing roller 5.

An air supply line 13 connects an air tank 12 of an air compressor 11 to a nozzle 14 juxtaposed against one end of the rotary shaft 4. The nozzle 14 is connected to a water tank 15 via a feed water line 16, and maintained in communication with the aerating openings 7 via the hollow rotary shaft 4. A filter 17 and an electromagnetic control valve 18 are mounted in the feed water line 16. The parts described hereinabove constitute a moisture adding means.

The outer periphery of the perforated wall cylinder 3 communicates with the air drawing passage 20 of a blower 19 and draws air from the rice polishing chamber 6. These parts constitute a venting means for effecting removal of rice-bran and dehumidification of rice grains by an air current ejected through the slits 9 in the aerating and rice polishing roller 5 via the aerating openings 7 in the rotary shaft 4.

Rice grain cooling and humidifying means generally designated by the reference numeral 21 includes a vessel 27 formed with a rice supply port 25 in the upper portion and a rice grain output port 26 in the lower portion. The vessel 27 has located therein a plurality of rows of flow beds 24 each having an open end 22 at the bottom and a closed end 23 at the top. The plurality of rows of flow beds 24 are arranged in a plurality of layers in a superimposed relation in such a manner that the flow beds 24 of the adjacent layers are offset. The alternate layers of flow beds 24 communicate at one end thereof with an air supply means 28 provided with an air blower 29 via an air supply chamber 30 (see FIG. 2), while the rest of the layers of flow beds 24 communicate at the other end thereof with an air exhausting section 31 via an air exhausting chamber 32. The rice grain outlet port 26 is connected to the supply section 2 of the rice polishing means 1.

The air supply means 28 has a heat exchanger 34, which is part of an air cooling means 33, mounted therein. The air supply means 28 is connected to an air humidifying means 35, the latter of which includes a water tank 36, a feed water line 39, a filter 37 and a valve 38, so that cooled and humidified air can be supplied to the rice grain passage in the rice grain cooling and humidifying means 21.

Operation of the embodiment of the apparatus in conformity with the invention will now be described. Rice grains supplied through the rice grain supply port 25 into the vessel 27 are agitated as they are scattered and collected by the layers of flow beds 24 arranged in staggered relationship as they move downwardly through the vessel 27. In this process, the rice grains are cooled and humidified by the cooled and humidified air from the air cooling means 33 and the air humidifying means 35 and supplied, via the air supply chamber 30, to the flow beds 24. After moving downwardly through the vessel 27, the cooled and humidified rice grains are discharged via the rice grain outlet port 26.

Figure 2:
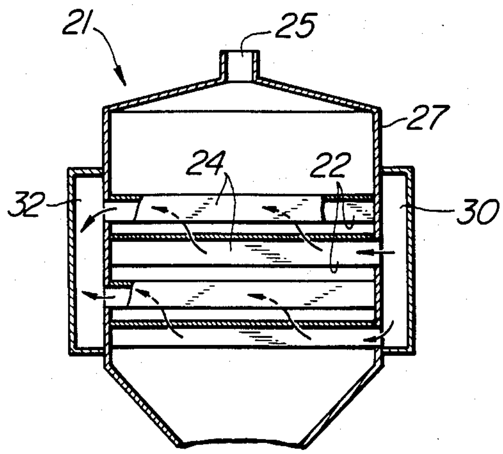
FIG. 2 is a side sectional view of the essential portions of the embodiment shown in FIG. 1.

The cooled and humidified air supplied to the vessel 27 flows through the lower open ends 22 of the flow beds 24 of alternate layers to cool and humidify the rice grains as indicated by arrows in FIGS. 1 and 2. Then the air flows through the air exhausting chamber 32 and air exhausting section 31 and is discharged to outside.

The rice grains cooled and humidified by the rice grain cooling and humidifying means 21 and discharged via the rice grain outlet port 26 are supplied to the rice grain supply section 2 in the upper portion of the rice polishing means 1. The rice grains are transferred to the rice polishing chamber 6 by means of the rice grain transfer roll 10. In the rice polishing chamber 6, the rice grains are forcedly agitated as the aerating and rice polishing roller 5 having the projections 8 rotates so that the rice grains rub against one another and polished by friction.

At this time, air is supplied from the air tank 12 of the air compressor 11 to the nozzle 14. The air is humidified by mixing with water in the nozzle 14. The water is supplied through the feed water line 16 which is connected to the water tank 15. The humidified air flows through the hollow rotary shaft 4 and is ejected into the polishing chamber 6 through the aerating openings 7 formed in the rotary shaft 4 and the slits 9 formed in the aerating and rice polishing roller 5, by the action of the venting means described previously.

In this way, moisture in a liquid state is caused to adhere to and be absorbed by the surfaces alone of the rice grains. This softens a very small thickness of the surface which is stripped off by friction in the rice polishing chamber 6. The rice-bran produced is ejected through the perforations of the cylinder 3 and exhausted via the air passage 20 by the blower 19, so that moisture and rice-bran are removed from the rice grains.

Figure 3:
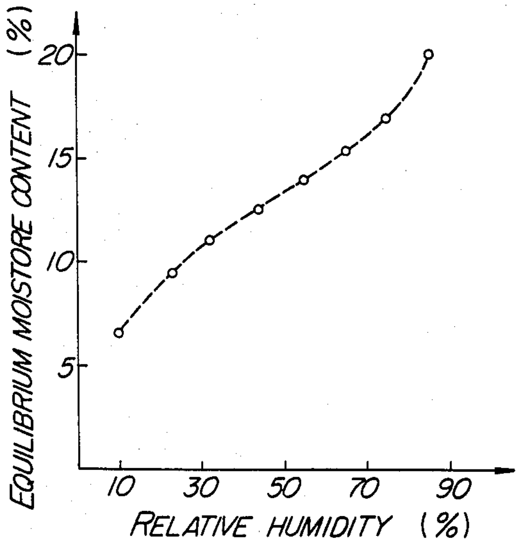
FIG. 3 is a diagram showing the relation between the equilibrium moisture content of rice grains and the relative humidity thereof.

The rice grains supplied through the rice grain supply port 25 to the rice grain cooling and humidifying means 21 are white rice which have been polished to a yield of below 96% with respect to brown rice. The rice grains supplied at 31° C., for example, move through the means 21 at a flow rate of 4 tons per hour and are cooled and humidified by a current of cooling and humidifying air flowing at 50 $m^3$ per minute and having a temperature of 12° C. and a humidity of 90%. This is equal to a relative humidity of 63% which corresponds to the equilibrium moisture content of 15% of the rice grains (refer to FIG. 3). The rice grains are thereby cooled to 23° C. and humidified.

In the rice polishing means 1, water in the range between 2 and 50 kg per hour and air in the range between 0.2 and 15 $m^3$ per minute are supplied to rice grains moving therethrough at a flow rate of 1 ton per hour to cause moisture in a liquid state to adhere to and be absorbed by the surfaces of the rice grains. The softened surface layers of the rice grains of a very small thickness are stripped off the rice grains by the frictional action of the rice polishing roller 5 and the rubbing action of the rice grains against one another. The moisture-containing rice-bran produced is exhausted from the rice polishing means 1 through the perforations of the cylinder 3, to thereby produce rice of superhigh gloss.

From the foregoing description, it will be appreciated that the method of producing rice of superhigh gloss according to the invention is characterized by contacting rice grains which have been polished beforehand to a yield of below 96% with respect to brown rice, with a current of cooling and humidifying air of a temperature of below 25° C. and of a humidity capable of maintaining the rice grains at an equilibrium moisture content so as to reduce the temperature of the rice grains to below 25° C.; and rubbing the surfaces of the rice grains, while further humidifying same, so that the rice grains can be polished while having an air current applied thereto. The advantages offered by the rice produced by this method include freedom from the fear of crack formation on their surfaces by drying when cooled, good adherence of moisture to the surfaces because moisture is not added to the rice grains at high temperature, increased surface hardness caused by cooling enabling a smooth, superhigh glossy surface to be obtained by the rubbing action of the rice grains against one another, increased quality of the rice due to the treatment given at low temperature, and an increased yield because of low rice-bran production.

The apparatus for producing rice of superhigh gloss according to the invention is characterized in that air supply means, including an air cooling means and an air humidifying means, is connected to a rice grain passage of rice grain cooling and humidifying means; a rice grain outlet of the rice grain cooling and humidifying means connected to a rice grain supply section of rice polishing means including a perforated wall cylinder having an aerating and rice polishing roller, rotatably supported therein; and the perforated wall cylinder and the aerating and rice polishing roller defining therebetween a rice polshing chamber communicating with a venting means and a moisture adding means. In addition to the aforesaid advantages, the advantages offered by the apparatus include simultaneous and uniform cooling and humidifying of the rice grains; continuous operation of cooling and humidifying of the rice grains; and humidifying, rubbing and polishing thereof. The apparatus is of an overall compact size obtained and produces rice of superhigh gloss, with increased efficiency in operation.

If desired, a glazing drum may be mounted to give an additional treatment to the rice grains discharged from the rice polishing means to further increase the gloss of the rice.

What is claimed is:

1. Apparatus for producing rice grains having super-high gloss, comprising:

a vessel having an inlet port, an outlet port, and a delivery passage between said inlet and outlet ports to allow rice grains to pass from said inlet port to said outlet port;

air supply means openly connected to said delivery passage for supplying cooling and humidifying air thereinto and into direct contact with the rice grains flowing through said delivery passage, so as to cool and harden and simultaneously to humidify such rice grains to prevent cracks from being developed on the surface thereof;

a frame;

a perforated cylindrical member mounted on said frame; and a polishing roll rotatably mounted on said frame and disposed within said perforated cylindrical member in generally concentric relation thereto; said polishing roll and said perforated cylindrical member defining therebetween a polishing chamber communicating with said outlet port of said vessel so that the rice grains cooled and humidified in said delivery passage may be supplied into said polishing chamber.

2. The apparatus of claim 1 further comprising a humidifying-air supply means communicating with said polishing chamber for supplying humidifying air thereto to humidify the hardened rice grains and to soften only a surface layer thereof; and rotation means for rotating said polishing rolls to cause the softened surface layer of each rice grain to be removed therefrom.

3. The apparatus of claim 2 wherein means are provided to supply moisture and air to the humidifying-air supply means.

4. The apparatus of claim 2 which further comprises exhaust means communicating with said polishing chamber for drawing air together with the removed surface layers out of said polishing chamber through the apertures in said perforated cylindrical member.

5. The apparatus of claim 2 further comprising: a hollow shaft rotatably supported by said frame and having a closed end and an open end; a hollow polishing roll having openings in the wall thereof mounted on said hollow shaft in generally concentric relation thereto for rotation therewith, said shaft having a perforated wall section located within the hollow portion of said polishing roll so that the hollow portion of said shaft is in communication with said polishing chamber; humidifying-air supply means including a source of pressurized air and a source of water; and a nozzle located at the open end of said hollow shaft and connected to the humidifying-air supply means to admix pressurized air and water and to inject said admixture into said polishing chamber through the hollow portion of and the apertures in the perforated wall section of said shaft, and through the openings in said hollow polishing roll.

6. The apparatus of claim 1 wherein the air supply means includes: an air blower; a duct having one end connected to said air blower and the other end connected to said delivery passage; cooling means for cooling air flowing through said duct; and humidifying means for supplying moisture to air flowing through said duct.

7. The apparatus of claim 1 wherein said vessel has an air exhausting chamber and two types of elongated flow bed members extending across said delivery passage, each of said flow bed members having a generalling inverted V-shaped cross-section and being arranged in a plurality of rows in a generally parallel and spaced relationship, the first type of said flow bed members having one longitudinal end closed and the other longitudinal end communicating with said air supply chamber, and the second type of said flow bed members having one longitudinal end closed and the other longitudinal end communicating with said air exhausting chamber.

8. The apparatus of claim 7 wherein alternate and adjacent rows of said flow bed members are of different types and arranged in staggered relationship.

* * * * *